US011171574B2

(12) United States Patent
Asakura et al.

(10) Patent No.: US 11,171,574 B2
(45) Date of Patent: Nov. 9, 2021

(54) POWER CONVERSION DEVICE WITH ESTIMATION OF LOAD VOLTAGE BASED ON ELECTROSTATIC CAPACITANCE OF LOAD OR CORRECTION COEFFICIENT

(71) Applicant: Mitsubishi Electric Corporation, Chiyoda-ku (JP)

(72) Inventors: Ryota Asakura, Chiyoda-ku (JP); Tomokazu Sakashita, Chiyoda-ku (JP); Takahiro Inoue, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/616,777

(22) PCT Filed: Apr. 2, 2018

(86) PCT No.: PCT/JP2018/014050
§ 371 (c)(1),
(2) Date: Nov. 25, 2019

(87) PCT Pub. No.: WO2019/008850
PCT Pub. Date: Jan. 10, 2019

(65) Prior Publication Data
US 2020/0274440 A1    Aug. 27, 2020

(30) Foreign Application Priority Data
Jul. 3, 2017  (JP) .............................. JP2017-130121

(51) Int. Cl.
*H02M 7/48* (2007.01)
(52) U.S. Cl.
CPC ................................. *H02M 7/4826* (2013.01)
(58) Field of Classification Search
CPC .................................................. H02M 7/4826
See application file for complete search history.

(56) References Cited

U.S. PATENT DOCUMENTS

| 8,923,015 B2 * | 12/2014 | Madawala | .......... | H02J 7/00712 363/17 |
| 2014/0354073 A1 * | 12/2014 | Sadakata | ................. | H02J 50/10 307/104 |

(Continued)

FOREIGN PATENT DOCUMENTS

JP     2013-226002 A    10/2013

OTHER PUBLICATIONS

M. Gulko, D. Medini and S. Ben-Yaakov, "Inductor-controlled current-sourcing resonant inverter and its application as a high pressure discharge lamp driver," Proceedings of 1994 IEEE Applied Power Electronics Conference and Exposition—ASPEC'94, 1994, pp. 434-440 vol. 1, doi: 10.1109/APEC.1994.316366. (Year: 1994).*

(Continued)

*Primary Examiner* — Peter M Novak
(74) *Attorney, Agent, or Firm* — Xsensus LLP

(57) ABSTRACT

To provide a power conversion device capable of estimating a load voltage with high accuracy without directly detecting the load voltage to be applied to a load, a control circuit includes an estimator for estimating the load voltage to be applied to the load based on an electric current of a resonant circuit, an AC frequency of an inverter and an electrostatic capacitance of the load, or an estimator for estimating the load voltage based on the electric current of the resonant circuit, the AC frequency of the inverter, an inductance of a resonant coil and a correction coefficient previously set from a relationship between a voltage of the resonant coil and the load voltage, and which controls an output to a target load voltage based on the estimated load voltage.

19 Claims, 14 Drawing Sheets

(56) References Cited

U.S. PATENT DOCUMENTS

2016/0148768 A1\* 5/2016 Wang .................... H01H 47/22
361/194
2018/0100564 A1\* 4/2018 Fliearman ................ F16H 3/54

OTHER PUBLICATIONS

International Search Report dated May 22, 2018 in corresponding PCT/JP2018/014050 filed on Apr. 2, 2018.

\* cited by examiner

POWER CONVERSION DEVICE WITH ESTIMATION OF LOAD VOLTAGE BASED ON ELECTROSTATIC CAPACITANCE OF LOAD OR CORRECTION COEFFICIENT

TECHNICAL FIELD

The present application relates to a power conversion device for controlling an output voltage.

The control of the output voltage of the power conversion device occurs by detecting the output voltage and comparing the output voltage with a reference voltage. When the output voltage is a high voltage, there is a danger of incurring the increase in size and in cost of a device for securing insulation when the output voltage is directly detected.

Accordingly, to estimate the output voltage while avoiding the direct detection of the output voltage is proposed in Patent Literature 1.

In a power conversion device in Patent Literature 1, a resonant circuit is connected between an inverter device and a rectifier circuit, and the inverter device is intermittently operated at an output frequency equivalent to a resonant frequency of the resonant circuit. A value obtained by computing a difference between an increase amount of an output current value of the inverter device per unit time of an effective value from an input voltage value of the inverter device and a product of an inductance of an inductor of the resonant circuit (a resonant coil) is multiplied by a ratio of transformation by combining a transformer and the rectifier circuit, thereby estimating an output voltage of the rectifier circuit. A power conversion device is thus controlled in accordance with a result of comparing the estimated value with a reference voltage value. Accordingly, a voltage detector and a current detector are not used at all on an output side, therefore, costs and maintenance work relating to the voltage detector, peripheral circuits and wiring on the output side can be reduced.

CITATION LIST

Patent Literature

Patent Literature 1: JP-A-2013-226002

SUMMARY OF INVENTION

Technical Problem

In the configuration proposed in Patent Literature 1, a balance between an inductor voltage of the resonant circuit (a voltage of the resonant coil) and a capacitor voltage is lost when the inverter device is operated in the vicinity of the resonant frequency, therefore, there is a problem that the accuracy is low in the estimation of the output voltage using the inductance and the inverter current, which is not suitable for the accuracy in controlling the output voltage.

The present application has been made to solve the above problem and an object of the present application is to provide a power conversion device capable of estimating the output voltage with high accuracy and a barrier-discharge type ignition system using the power conversion device.

Solution to Problem

A power conversion device disclosed in the present application includes an inverter supplying an AC voltage, a resonant circuit including a resonant coil and a load, amplifying the AC voltage by resonance, a current detection circuit detecting a resonant circuit current flowing in the resonant circuit and a control circuit having a means for estimating a load voltage based on the resonant circuit current, an AC frequency of the inverter and an electrostatic capacitance of the load or a means for estimating the load voltage based on the resonant circuit current, the AC frequency of the inverter, an inductance of the resonant coil and a correction coefficient previously set from a relationship between a voltage of the resonant coil and the load voltage.

Advantageous Effects of Invention

The power conversion device disclosed in the present application can estimate an output voltage by using the electrostatic capacitance of a capacitor, not using the inductance directly, therefore, estimation with high accuracy can be realized.

DESCRIPTION OF EMBODIMENTS

Embodiment 1

Figure 1:
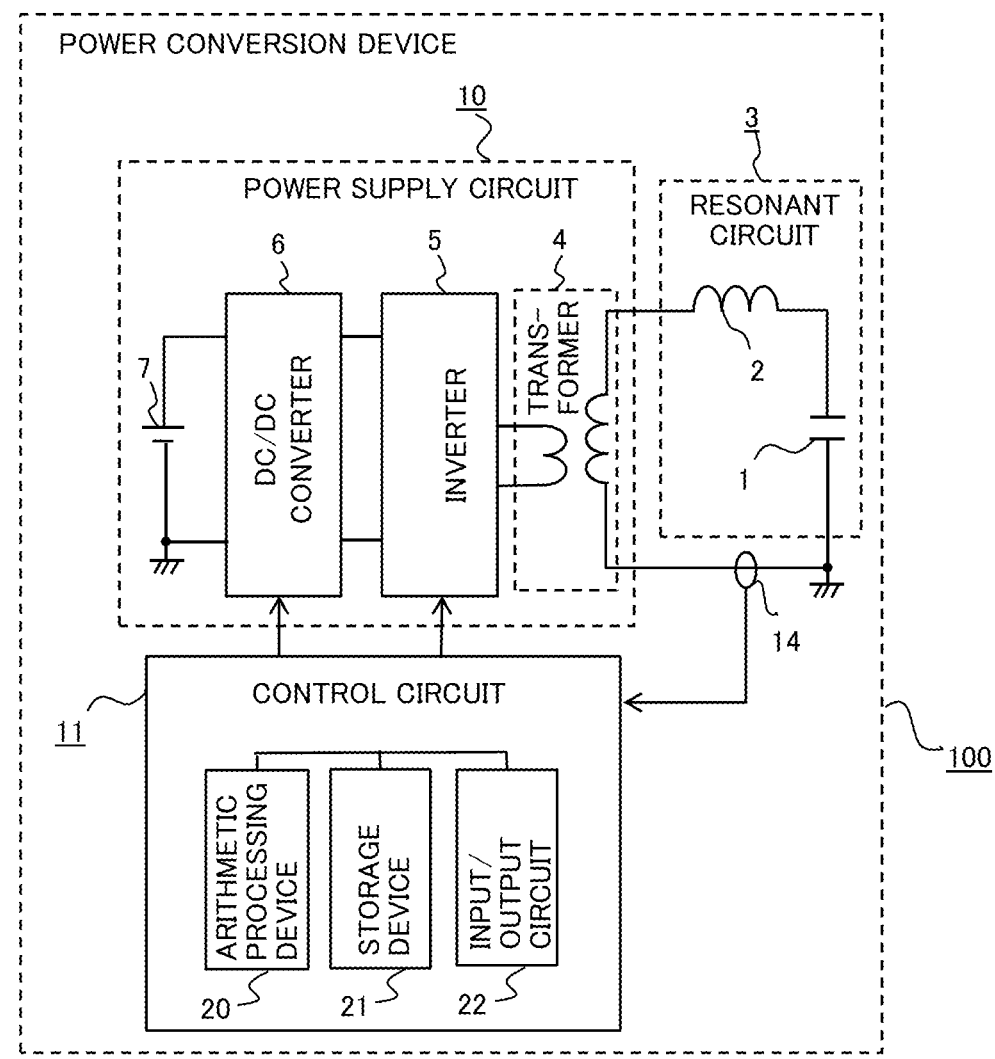
FIG. 1 is a circuit configuration diagram of a power conversion device according to Embodiment 1.

A power conversion device according to Embodiment 1 will be explained with reference to the drawings. FIG. 1 is a circuit configuration diagram of a power conversion device 100 according to the present application. The power conversion device 100 includes a power supply circuit 10 supplying an AC voltage, a resonant circuit 3 amplifying the AC voltage output from the power supply circuit 10 by resonance, a capacitor 1 to which the AC voltage amplified by the resonant circuit 3 is applied, and a control circuit controlling the power supply circuit 10. In the embodiment, the capacitor 1 is described as a load, however, the power conversion device in which a resonant coil 2 is a load in the capacitor 1 and the resonant coils 2 configuring the resonant circuit 3 may be used.

The power supply circuit 10 includes a battery 7 as a DC power supply, a DC/DC converter 6 outputting an DC voltage supplied from the battery 7 in a different voltage, an inverter 5 converging the DC voltage output from the DC/DC converter 6 into an AC voltage and outputting the AC voltage and a transformer 4 outputting the AC voltage output from the inverter 5 in an arbitrary voltage in accordance with a turn ratio and supplying the AC voltage to the resonant circuit 3.

The DC voltage of the battery 7 is converted into a different DC voltage in a range of, for example, 50V to 600V by the DC/DC converter 6 to be output to the inverter 5. The AC voltage converted by the inverter 5 is boosted to an AC voltage in a range of 500V to 30 kV in accordance with the turn ratio by the transformer 4 to be output to the resonance circuit 3. The AC voltage supplied by the transformer 4 is boosted to an AC voltage in a range of 5 kV to 50 kv in accordance with a series resonant action of an inductance element and a capacitance element of the resonant circuit 3, to be applied to the capacitor 1.

The DC/DC converter 6 has a switching device that is on-off controlled by the control circuit 11. Well-known various converters may be used for the DC/DC converter 6. For example, a boost chopper including a switching device, a diode and a reactor may be used, or an insulated DC/DC converter in a flyback-type or the like including a switching device, a diode and a transformer may be used. The DC/DC converter 6 may output an arbitrary voltage to boost or step down the voltage as well as may output the same voltage as the voltage of the battery 7. Furthermore, it is also preferable that one more DC/DC converter 6 is provided on an output side of the DC/DC converter 6, thereby boosting the voltage by the first DC/DC converter 6 and stepping down the voltage by the second DC/DC converter 6.

The inverter 5 has a switching device that is on-off controlled by the control circuit 11. Well-known various inverters may be used for the inverter 5. For example, a half bridge circuit including a series circuit in which two switching devices with anti-parallel connected diodes are connected in series may be used, or a full-bridge circuit in which two series circuits with two serial-connected switching devices with anti-parallel connected diodes are connected in parallel may be used. Furthermore, the inverter 5 may configure a circuit by using an insulated DC/DC converter of the flyback-type or a forward-type including a switching device, a diode and a transformer so as to supply the AC voltage directly from the battery 7 without through the DC/DC converter 6. Similarly, the DC/DC converter 6 may configure a circuit by using the insulated DC/DC converter in the flyback-type or the forward-type including the switching device, the diode and the transformer so as to supply the AC voltage directly without through the inverter 5.

An IGBT (Insulated Gate Bipolar Transistor), a MOSFET (Metal Oxide Semiconductor Field Effect Transistor) and so on are used for the switching devices of the DC/DC converter 6 and the inverter 5. The switching device may be formed of a semiconductor using Si (silicon), or may be formed of wide bandgap semiconductors such as SiC (silicon carbide), GaN (gallium nitride), Ga2O3 (gallium oxide), diamond and so on.

The transformer 4 includes a primary winding connected to the inverter 5, a secondary winding connected to the resonant circuit 3 and an iron core around which the primary winding and the secondary winding are wound. The turn ratio of the transformer 4 is determined by a ratio of the number of turns of the secondary winding with respect to the number of turns of the primary winding. The voltage supplied to the resonant circuit 3 by the transformer 4 may be boosted and stepped down, or may be a voltage with the same multiple (1 times) for insulation or for noise countermeasures. The transformer 4 may be removed when an application voltage necessary for the capacitor 1 can be secured by the resonant circuit 3 alone.

The resonant circuit 3 is configured by a series circuit of the inductance element and the capacitance element. The resonant circuit 3 is configured by an inductance component of the resonant coil 2 and a capacitance component possessed by the capacitor 1, and a leakage inductance component of the transformer 4. The resonant circuit 3 may be configured by the inductance component of the resonant coil 2 and the capacitance component possessed by the capacitor 1, as well as may be configured by the leakage inductance component of the transformer 4 and the capacitance component possessed by the capacitor 1. The capacitance component of the resonant circuit 3 may be increased or reduced by connecting the capacitance element of the capacitor or the like to the capacitor 1 in parallel or in series.

The power conversion device 100 includes a current detection circuit 14 detecting an electric current flowing in the resonant circuit 3 (hereinafter, referred to as a resonant circuit current). In the embodiment, the current detection circuit 14 detects the electric current from a reference potential (low-side) of the power conversion device 100. The current detection circuit 14 inputs the resonance circuit current (as a voltage) into the control circuit 11 by using, for example, a current transformer method, a hall element method, a shunt resistor method and so on. As a setting position of the current detection circuit 14 detecting the resonant circuit current, the current detection circuit 14 (high-side) is set in wiring for connecting the transformer 4 to the resonant coil 2 to thereby detect the resonant circuit current though a high voltage may be applied. As a means for calculating the resonant circuit current, the current detection circuit 14 (high-side or low-side) is set on a transformer primary side, and an electric current on the transformer primary side is divided by a transformer ratio by the control circuit 11 to thereby calculate the resonant circuit current. That is, a term of detection is used here, however, the detection includes a case where a current value is measured and the measured value is directly used and a case where a value of a parameter different from a current value to be detected is measured and the current value to be detected is calculated from the measured value.

The control circuit 11 increases/reduces the application voltage of the capacitor 1 by controlling the DC/DC converter 6 and the inverter 5 based on a later-described means for estimating an output voltage to be applied to the capacitor 1. A processing circuit of the control circuit 11 may be configured by an analog electronic circuit including a comparator, an operational amplifier, a differential amplifier circuit and the like, may be configured by a digital electronic circuit including an arithmetic processing device, a storage device, an input/output circuit and the like, and may be configured by both the digital electronic circuit and the analog electronic circuit.

Here, as the arithmetic processing device, a CPU (Central Processing Unit), a DSP (Digital Signal Processor), an ASIC (Application Specific integrated Circuit), a FPGA (Field Programmable Gate Array) and so on are used. It is also preferable that plural same kinds or different kinds of arithmetic processing devices are provided and respective processing is executed by being shared. As the storage device, a RAM (Random Access Memory), a ROM (Read Only Memory) and the like are used. The input/output circuit includes an input circuit such as an A/D converter inputting output signals from various sensors, switches and the like into the arithmetic processing device and an output circuit such as a drive circuit outputting control signals from the arithmetic processing device to an electric load and so on. The arithmetic processing circuit such as the CPU executes a program stored in the storage device such as the ROM and executes respective processing in corporation with other hardware in the control circuit 11 such as the storage device and the input/output circuit.

The control circuit 11 drives switching devices of the DC/DC converter 6 and the inverter 5 to be on/off by PWM (Pulse Width Modulation) control to thereby boost the application voltage to the capacitor 1. In the case where the DC/DC converter 6 is the boost chopper, the control circuit 11 increases/reduces an on-duty ratio of the switching device of the DC/DC converter 6 to thereby increase/reduce an output DC voltage. In the case where the inverter 5 is formed by the half bridge circuit in which a first switching device and a second switching device are connected in series, the control circuit 11 turns on the first switching device and the second switching device alternately in an AC voltage cycle (also referred to as an AC cycle) to thereby convert the DC voltage into the AC voltage in the AC voltage cycle. The control circuit 11 may also be configured so as to increase/reduce an output AC voltage by increasing and reducing an on-period (on-duty ratio) of the first switching device and an on-period (on-duty ratio) of the second switching device in a half cycle of the AC voltage cycle.

<Control Method of Output Voltage Applied to Capacitor 1>

As a method of changing the output voltage to be applied to the capacitor 1, there are a method of changing the output DC voltage of the DC/DC converter 6, a method of changing an AC frequency generated by the inverter 5 and the like. When the AC frequency of the inverter 5 is approximated to the vicinity of the resonant frequency, a voltage amplification gain Vgain of the resonant circuit 3 is increased, therefore, the application voltage of the capacitor 1 is increased. On the other hand, when the AC frequency is far from the resonance frequency, the voltage amplification gain Vgain of the resonant circuit 3 is reduced, therefore, the application voltage of the capacitor 1 is reduced. The AC frequency is a reciprocal of the AC cycle.

Figure 2:
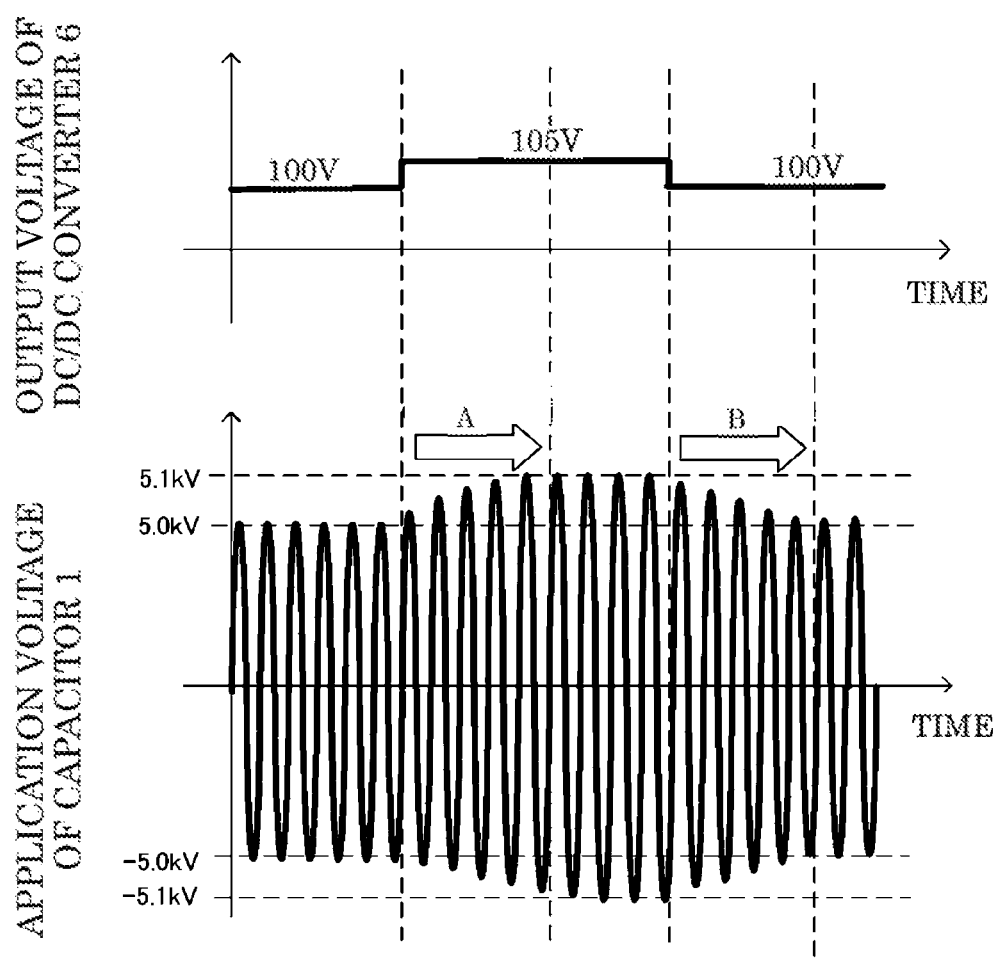
FIG. 2 is a timing chart showing a time delay due to resonant growth of a resonant circuit and a time delay due to resonant negative growth in a case where an output voltage of the DC/DC converter is changed according to Embodiment 1.

FIG. 2 is a timing chart showing a time delay due to resonant growth of the resonant circuit and a time delay due to resonant negative growth in a case where the output voltage of the DC/DC converter is changed according to Embodiment 1 of the present application, which shows control behavior in the case where an output DC voltage of the DC/DC converter 6 is changed. In FIG. 2, the horizontal axis represents time and the vertical axis represents the output voltage of the DC/DC converter 6 and the application voltage of the capacitor 1. When the output DC voltage of the DC/DC converter 6 is increased by 5V in a step for increasing the application voltage of the capacitor 1 by 0.1 kV, a delay occurs in the boost of the application voltage of the capacitor 1 due to a time delay caused by resonant growth in the resonant circuit 3. This is shown by an arrow A in the drawing as a "time delay due to resonant growth". Conversely, when the output DC voltage of the DC/DC converter 6 is reduced by 5V in a step, a delay occurs in the reduction of the application voltage of the capacitor 1 due to a time delay caused by resonant negative growth. This is shown by an arrow B in the drawing as a "time delay due to resonant negative growth".

Figure 3:
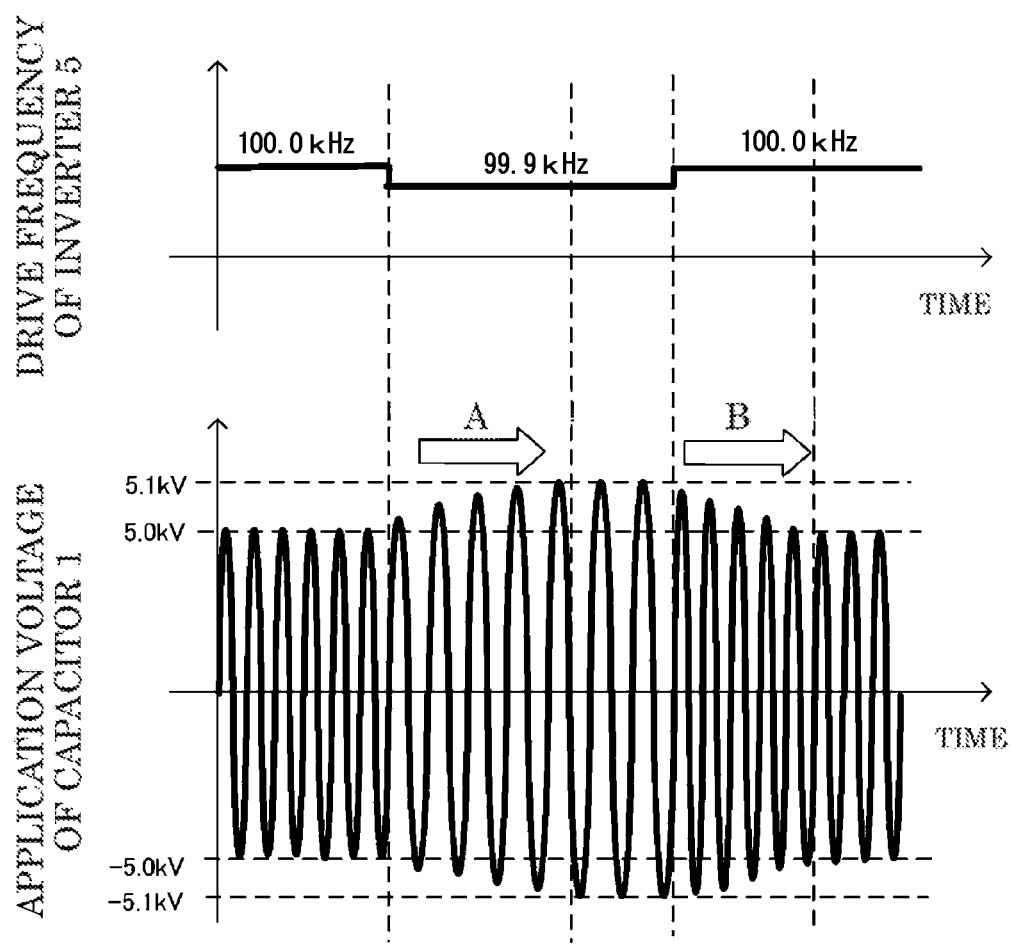
FIG. 3 is a timing chart showing a time delay due to resonant growth of the resonant circuit and a time delay due to resonant negative growth in a case where an AC frequency of the inverter is changed according to Embodiment 1.

FIG. 3 is a timing chart showing a time delay due to resonant growth of the resonant circuit and a time delay due to resonant negative growth in a case where the AC frequency of the inverter is changed according to Embodiment 1 of the present application. In FIG. 3, the horizontal axis represents time and the vertical axis represents the AC frequency of the inverter 5 and the application voltage of the capacitor 1. When the AC frequency of the inverter is reduced by 0.1 kV in a step for increasing the application voltage of the capacitor 1 by 0.1 kV, a delay occurs in the boost of the application voltage of the capacitor 1 due to a time delay caused by resonant growth in the resonant circuit 3. Conversely, when the AC frequency of the inverter 5 is increased by 0.1 kV in a step, a delay occurs in the reduction of the application voltage of the capacitor 1 due to a time delay caused by resonant negative growth.

Also in the resonant circuit current, a time delay caused by resonant growth and a time delay caused by resonant negative growth occur.

<Frequency Characteristics of Application Voltage in Resonant Circuit 3>

Figure 4A:
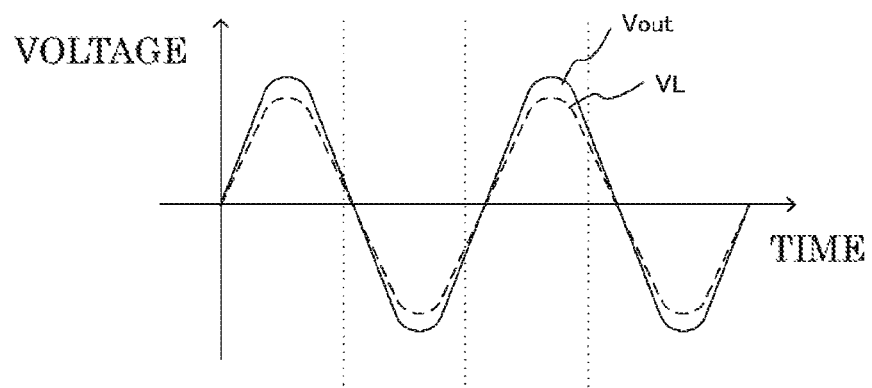
FIG. 4A is a waveform diagram showing a relationship between an application voltage VL to a resonant coil 2 and an application voltage Vout to a capacitor 1 according to Embodiment 1.
Figure 4B:
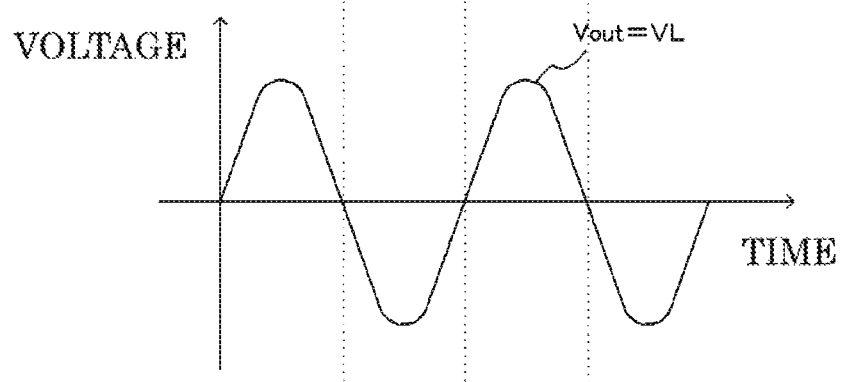
FIG. 4B is a waveform diagram showing a relationship between the application voltage VL to the resonant coil 2 and the application voltage Vout to the capacitor 1 according to Embodiment 1.
Figure 4C:
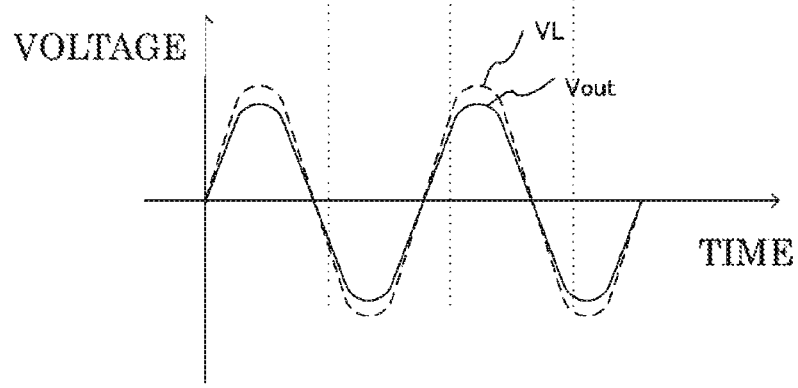
FIG. 4C is a waveform diagram showing a relationship between the application voltage VL to the resonant coil 2 and the application voltage Vout to the capacitor 1 according to Embodiment 1.

FIG. 4A, FIG. 4B and FIG. 4C are waveform diagrams showing a relationship between a voltage VL applied to the resonant coil 2 and a voltage Vout applied to the capacitor 1 according to Embodiment 1 of the present application. In respective drawings, the horizontal axis represents time and the vertical axis represents voltage, and the difference in the relationship between the voltage applied to the resonant coil 2 and the voltage applied to the capacitor 1 according to conditions of an AC frequency f1 of the inverter 5 and a resonant frequency fr of the resonant circuit 3 are shown. The resonant frequency fr of the resonant circuit 3 can be calculated by formula (1) when an inductance such as a leakage inductance of the resonant coil and the transformer 4 is L and an electrostatic capacitance of the capacitor 1 is C.

[Formula 1]

$$fr = 1/(2\pi\sqrt{L \cdot C}) \quad (1)$$

When the AC frequency f1 of the inverter 5 is lower than the resonant frequency fr of the resonant circuit 3, respective impedances of the resonant coil 2 and the capacitor 1 have a relation of formula (2) when an angular frequency is ω.

[Formula 2]

$$\omega \cdot L < 1/(\omega \cdot C) \quad (\omega = 2\pi \cdot f1) \quad (2)$$

Therefore, the voltage can be represented by a product of the impedance and the electric current from the relation of impedances of formula (2). The voltage VL applied to the resonant coil 2 is lower than the voltage Vout applied to the capacitor 1 as shown in FIG. 4A.

When the AC frequency f1 of the inverter 5 is equal to the resonant frequency fr of the resonant circuit 3, respective impedances of the resonant coil 2 and the capacitor 1 have a relation of formula (3).

[Formula 3]

$$\omega \cdot L = 1/(\omega \cdot C) \quad (3)$$

Therefore, the voltage VL applied to the resonant coil 2 is equal to the voltage Vout applied to the capacitor 1 from formula (3) as shown in FIG. 4B.

Furthermore, when the AC frequency f1 of the inverter 5 is higher than the resonant frequency fr of the resonant circuit 3, respective impedances of the resonant coil 2 and the capacitor 1 have a relation of formula (4).

[Formula 4]

$$\omega \cdot L > 1/(\omega \cdot C) \quad (4)$$

Therefore, the voltage VL applied to the resonant coil 2 is higher than the voltage Vout applied to the capacitor 1 from formula (4) as shown in FIG. 4C.

<Method of Estimating Output Voltage by Capacitor 1>

According to the above frequency characteristics of the application voltage of the resonant circuit 3, a relationship between the voltage VL applied to the resonant coil 2 and the voltage Vout applied to the capacitor 1 is changed depending on the AC frequency f1 of the inverter 5 at the time of operating the inverter 5 in the vicinity of the resonant frequency fr of the resonant circuit 3, and the voltage VL applied to the resonant coil 2 is not always equal to the voltage Vout applied to the capacitor 1. Therefore, the output voltage is estimated with high accuracy by using an electrostatic capacitance C of the capacitor 1 in the embodiment.

The control circuit 11 estimates the output voltage by using a resonance circuit current I obtained from the current detection circuit 14, the electrostatic capacitance C of the capacitor 1 calculated by an impedance analyzer in advance and the AC frequency f1 of the inverter 5. As the voltage is a product of the electric current and the impedance, an output voltage estimated value Vout1 is represented by Formula (5)

[Formula 5]

$$Vout1 \approx I/(2\pi \cdot f1 \cdot c) \quad (5)$$

The output DC voltage of the DC/DC converter 6 and the AC frequency f1 of the inverter 5 are controlled based on Formula (5) so as to narrow a difference between the output voltage estimated value Vout1 and an output voltage command value Vref to thereby perform constant output voltage control. The output voltage command value Vref is an arbitrary voltage value necessary for operating the load (the arbitrary voltage value may differ according to the load to be operated). To perform constant output voltage control so as to narrow the difference between the output voltage estimated value Vout1 and the output voltage command value Vref means that control is performed to be a load voltage as a target value.

<Constant Output Voltage Control by Inverter 5 and DC/DC Converter 6>

Concerning the constant output voltage control of the capacitor 1, a method of increasing the output voltage estimated value Vout1 to follow the output voltage command value Vref will be explained. As initial conditions, the output DC voltage of the DC/DC converter 6 is Vdc, and the AC frequency f1 of the inverter 5 is far from the resonant frequency fr of the resonant circuit 3.

In a case where the output voltage estimated value Vout1 is lower than the output voltage command value Vref, the voltage amplification gain Vgain of the resonant circuit 3 is increased by approximating the AC frequency f1 of the inverter 5 to the resonant frequency fr of the resonant circuit 3. The resonant circuit current I is also increased together with the voltage gain amplification, and the calculated output voltage estimated value Vout1 is also increased to be close to the output voltage command value Vref.

As a control cycle in which the AC frequency f1 of the inverter 5 is changed, control is performed at every AC cycle of plural times in consideration of resonant growth and the like. The control may be performed at every AC frequency for speeding up control response. In a case where the difference between the output voltage estimated value Vout1 and the output voltage command value Vref is small, the AC frequency f1 of the inverter 5 is approximated to the resonant frequency fr of the resonant circuit 3 to thereby follow the command value. In a case where the difference is large, there is a case where the output voltage estimated value Vout1 remains lower than the command value Vref and does not follow the command value Vref by simply changing the AC frequency f1 of the inverter 5 even when the AC frequency f1 of the inverter 5 is allowed to be correspond to the resonant frequency fr.

In response to the above, the voltage input to the resonant circuit 3 is increased by boosting the output DC voltage Vdc of the DC/DC converter 6. The voltage amplification gain Vgain of the resonant circuit 3 has frequency dependence, and the amplification gain in the same frequency is maintained, therefore, the output voltage of the resonant circuit 3 can be increased by increasing an input voltage of the resonant circuit 3. The resonant circuit current I is also increased with the output voltage of the resonant circuit 3, and the calculated output voltage estimated value Vout1 is also increased to be approximated to the output voltage command value Vref. The change of the output DC voltage Vdc of the DC/DC converter 6 may be controlled at every AC cycle of plural times or controlled at every AC frequency in the same manner as the AC frequency f1 of the inverter 5.

Although the method of controlling the inverter 5 first has been described above, it is also preferable that the DC/DC converter is controlled first. Moreover, it is possible to control the inverter 5 and the DC/DC converter 6 little by little repeatedly in a manner that the DC/DC converter 6 is controlled next to the inverter 5, then, the inverter 5 is controlled, and then, the DC/DC converter 6 is controlled. Furthermore, the inverter 5 and the DC/DC converter 6 are controlled at the same time for speeding up control response.

Similarly, in order to perform control so as to step down the output voltage estimated value Vout1 to be close to the command value Vref, the control can be performed by a method of allowing the AC frequency f1 of the inverter 5 to be far from the resonant frequency fr of the resonant circuit 3 or a method of stepping down the output DC voltage Vdc of the DC/DC converter 6.

It is preferable to perform estimation in consideration of an equivalent series resistance R of the capacitor 1 for further improving estimation accuracy. The output voltage estimation value Vout1 in that case is represented by Formula (6).

[Formula 6]

$$Vout1 \approx I \cdot \sqrt{(R^2 + 1/(2\pi \cdot f1 \cdot C)}\qquad(6)$$

It is also preferable to perform estimation by referring to a map provided in the control circuit as the electrostatic capacitance C of the capacitor at the AC frequency f1 of the inverter 5 as C (f1) in consideration of frequency characteristics of the capacitor 1. The output voltage estimated value Vout1 in that case is represented by Formula (7).

[Formula 7]

$$Vout1 \approx I \cdot \sqrt{(R^2 + 1/(2\pi \cdot f1 \cdot C(f1))^2}\qquad(7)$$

Embodiment 1 shows the power conversion device estimating the output voltage by using the resonant circuit current I obtained from the current detection circuit 14, the electrostatic capacitance C of the capacitor 1 calculated in advance, and the AC frequency f1 of the inverter for estimating the output voltage with high accuracy. When the output voltage can be estimated with high accuracy, adequate control accuracy can be realized at the time of performing control to obtain a target load voltage (constant output voltage control).

Embodiment 2

In Embodiment 1, the estimation method using the electrostatic capacitance C of the capacitor 1 is shown as the method of estimating the output voltage of the capacitor 1 with high accuracy. In Embodiment 2, an estimation method of using a correction coefficient for estimation using the inductance L of the resonant coil 2 will be explained. Explanation of the same parts as Embodiment 1 is omitted.

As shown in Embodiment 1, when the AC frequency f1 of the inverter 5 is equal to the resonant frequency fr of the resonant circuit 3, the voltage VL applied to the resonant coil 2 corresponds to the voltage Vout applied the capacitor 1 as shown in Formula (8).

[Formula 8]

$$Vout = VL\qquad(8)$$

However, the relationship between the voltage VL applied to the resonant coil 2 and the voltage Vout applied to the capacitor 1 differs according to the AC frequency of the inverter 5, therefore, correction is necessary when estimation is performed from the inductance L of the resonant coil 2 with high accuracy. The output voltage estimated value Vout1 obtained after correction is represented by Formula (9) by multiplying a correction coefficient K.

[Formula 9]

$$Vout1 \approx K \cdot VL\qquad(9)$$

A theoretical formula of K can be derived by Formula 10, however, the output voltage estimated value Vout1 is the same as Formula (5), therefore, K is derived by using another means.

[Formula 10]

$$K = 1/(\omega^2 \cdot L \cdot C)\qquad(10)$$

Figure 5:
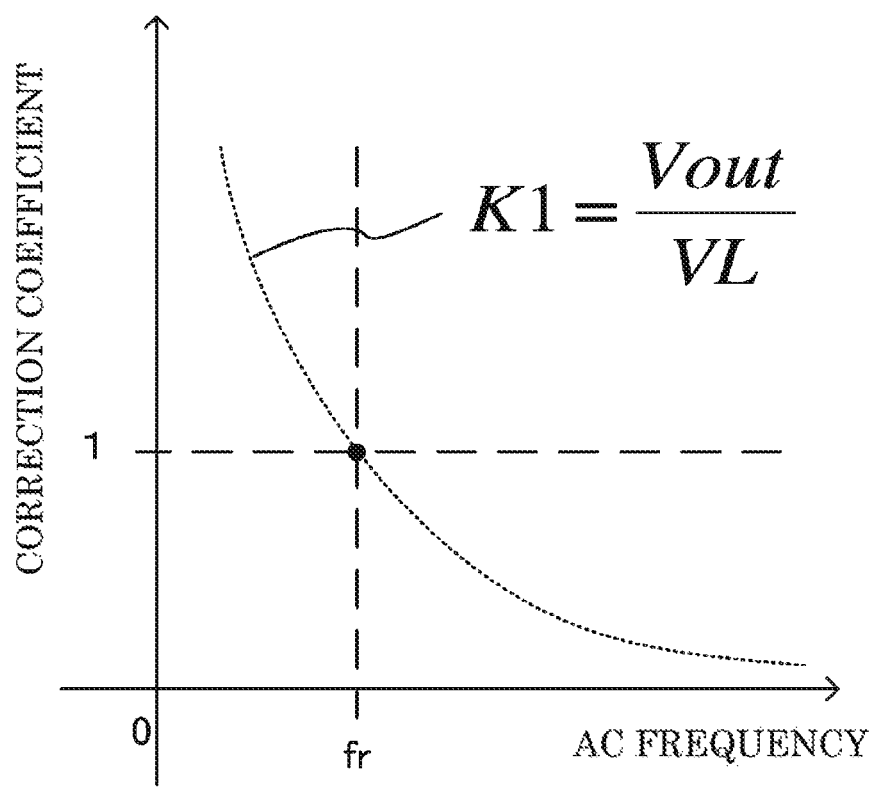
FIG. 5 is a relationship characteristics chart between the AC frequency of an inverter 5 and a correction coefficient according to Embodiment 2.

A correction coefficient K in the case of another means is K1. FIG. 5 is a relationship characteristics chart between the AC frequency of the inverter 5 and the correction coefficient according to Embodiment 2 of the present application. The chart is a map showing relationship characteristics in which the horizontal axis represents the AC frequency of the inverter 5 and the vertical axis represents the correction coefficient. The correction coefficient K1 is a value obtained by dividing the voltage Vout applied to the capacitor 1 by the voltage VL applied to the resonant coil 2. The above-described map is provided with the voltage VL applied to the resonant coil and the voltage Vout applied to the capacitor 1 as frequency relationship characteristics in the control circuit by using a voltage probe or the like as prior evaluation.

The output voltage estimated value Vout1 obtained after correction by using the above map is represented by Formula (11).

[Formula 11]

$$Vout1 \approx K1 \cdot I \cdot 2\pi \cdot f1 \cdot L\qquad(11)$$

As described above, the control circuit 11 estimates the output voltage by using the resonant circuit current I obtained from the current detection circuit 14, the inductance L of the resonant coil 2 calculated in advance, the AC frequency f1 of the inverter and the correction coefficient K1 in the AC frequency f1 of the inverter. The estimation may be performed in consideration of the equivalent series resistance R of the resonant coil 2 for further improving the estimation accuracy. The output voltage estimated value Vout1 in that case is represented by Formula (12).

[Formula 12]

$$Vout1 \approx I \cdot \sqrt{R^2 + (K1 \cdot 2\pi \cdot f1 \cdot L)^2}\qquad(12)$$

Furthermore, estimation may be performed in consideration of frequency characteristics L (f1) of the resonant coil 2. The output voltage value Vout1 in that case is represented by Formula (13).

[Formula 13]

$$Vout1 \approx I \cdot \sqrt{R^2 + (K1 \cdot 2\pi \cdot f1 \cdot L(f1))^2}\qquad(13)$$

Embodiment 2 shows the power conversion device estimating the output voltage by using the resonant circuit current I obtained from the current detection circuit 14, the inductance L of the resonant coil 2, the AC frequency f1 of the inverter, and the correction coefficient K1 in the AC frequency f1 of the inverter for estimating the output voltage with high accuracy. When the output voltage can be estimated with high accuracy, adequate control accuracy can be realized at the time of performing control to obtain a target load voltage (constant output voltage control).

Embodiment 3

A barrier-discharge type ignition system 200 according to Embodiment 3 will be explained with reference to the drawings. The barrier-discharge type ignition system 200 is configured by using the power conversion device explained in Embodiments 1 and 2, in which the capacitor 1 as the load in FIG. 1 is replaced with a barrier ignition plug. Accordingly, the explanation of the same parts as the above Embodiments 1 and 2 is omitted.

Figure 6:
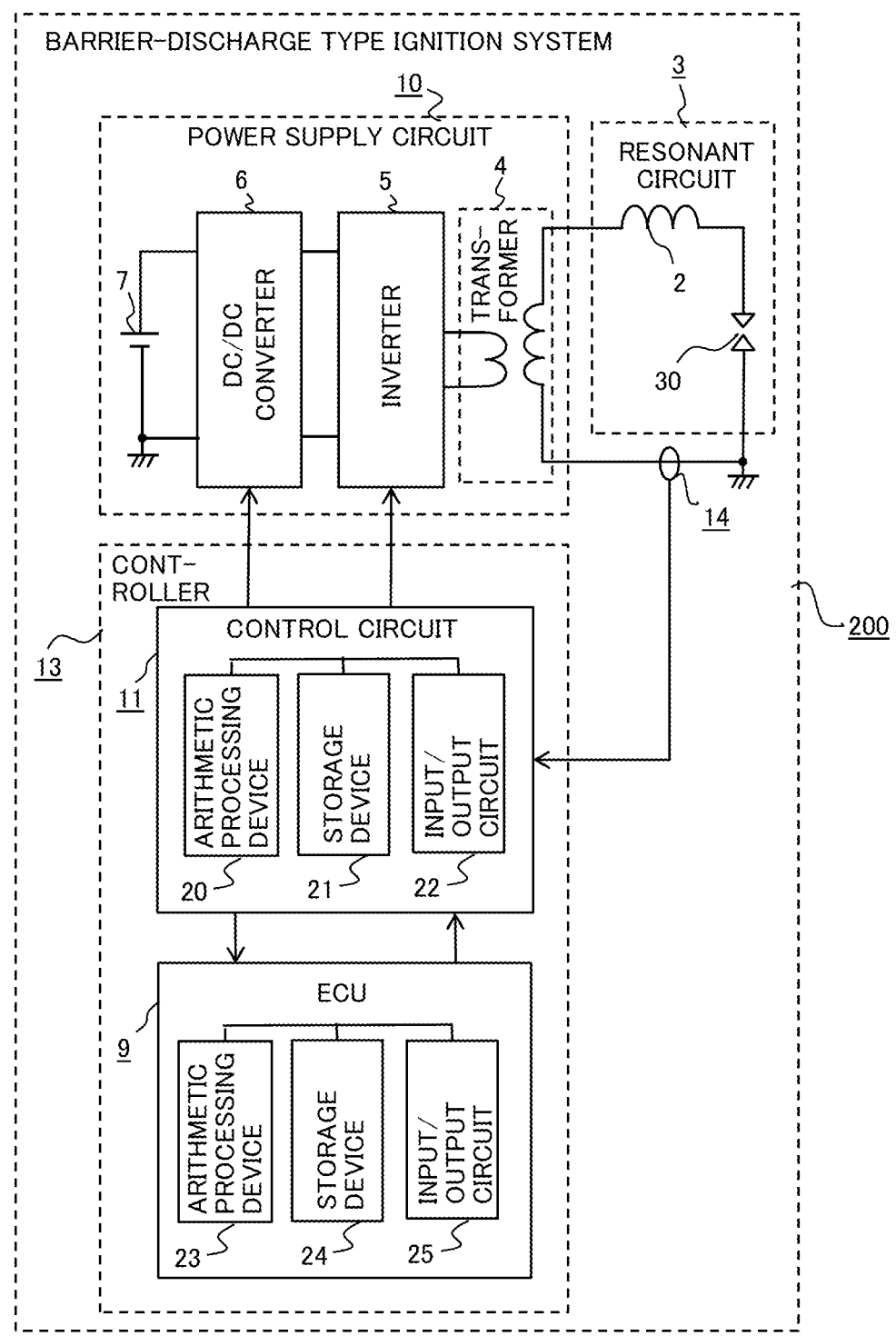
FIG. 6 is a circuit configuration diagram of a barrier-discharge type ignition system according to Embodiment 3.

FIG. 6 is a diagram showing a circuit configuration of the barrier-discharge type ignition system 200 according to Embodiment 3 of the present application. In the barrier-discharge type ignition system 200 shown in FIG. 6, the load is a barrier ignition plug 30 and electrostatic capacitance of the load changes depending on the existence of discharge. A method of estimating, with high accuracy, an output voltage of the barrier ignition plug 30 in which the electrostatic capacitance of the load changes depending on the existence of discharge differs from the methods of the above Embodiments 1 and 2 in a point that the output voltage estimated value is switched in accordance with detection of discharge. The method also differs in a point that a controller 13 including an engine control unit 9 (hereinafter, referred to as an ECU 9) is provided as a control means in addition to the control circuit.

The barrier ignition plug 30 is provided in a combustion chamber of an internal-combustion engine, and the barrier-discharge type ignition system 200 is an ignition system for the internal-combustion engine.

In the barrier ignition plug 30, an electrode is covered with a dielectric. For example, the barrier ignition plug 30 is formed so that a bar-shaped central electrode is covered with a dielectric in a bottomed cylindrical shape, and a periphery of the dielectric is surrounded by a cylindrical ground electrode through a discharge gap. The dielectric is formed of a dielectric material such as alumina, zirconia or titania, the central electrode is formed of an electrical conductive metal material such as Cu, Fe or Ni, and the ground electrode is formed of an electrical conductive metal material such as Fe, Ni or stainless steel.

The barrier-discharge type ignition system 200 applies a high voltage to the barrier ignition plug 30 to generate a discharge at the barrier ignition plug 30. When the discharge is generated at the barrier ignition plug 30, a mixed gas of air and fuel in the combustion chamber is ignited and flame propagates to the mixed gas in the combustion chamber explosively. The internal-combustion engine takes energy from a pressure increased by combustion of the fuel after ignition. It is also preferable to generate a non-ignition discharge as a discharge not reaching the ignition of the air-fuel mixture before ignition, to generate ozone and radical in the air-fuel mixture, to promote expansion of combustion at the time of ignition to thereby improve ignitability, the details of which are omitted in the embodiment.

The controller 13 includes the control circuit 11 and the ECU 9. The ECU 9 is a main controller for integrally controlling the internal-combustion engine, and the control circuit 11 controls the DC/DC converter 6 and the inverter 5 so as to generate the discharge at the barrier ignition plug 30 at an ignition timing instructed by the ECU 9.

The control circuit 11 includes an arithmetic processing device 20, a storage device 21 and an input/output circuit 22. The ECU 9 includes an arithmetic processing device 23, a storage device 24 and an input/output circuit 25. The control circuit 11 and the ECU 9 cooperate with each other by performing communication with each other.

The ECU 9 detects a rotation speed and a rotation angle of the internal-combustion engine based on an output signal from a crank angle sensor or the like, and detects an intake air amount taken into the combustion chamber of the internal-combustion engine based on an output signal of an intake-air amount sensor. Then, the ECU 9 calculates an ignition angle based on the rotation speed, the intake air amount and the like of the internal-combustion engine and determines the ignition timing based on the ignition angle and the rotation angle of the internal-combustion engine, which is instructed to the control circuit 11.

Information of an estimated application voltage for the barrier ignition plug 30 is input to the control circuit 11 based on a later-described means for estimating the output voltage to be applied to the barrier-ignition plug 30. The control circuit 11 performs on-off control of switching devices of the DC/DC converter 6 and the inverter 5 by PWM control at an ignition timing instructed by the ECU 9 thereby boost the application voltage of the barrier-ignition plug 30.

<Ignition Control>

Figure 7:
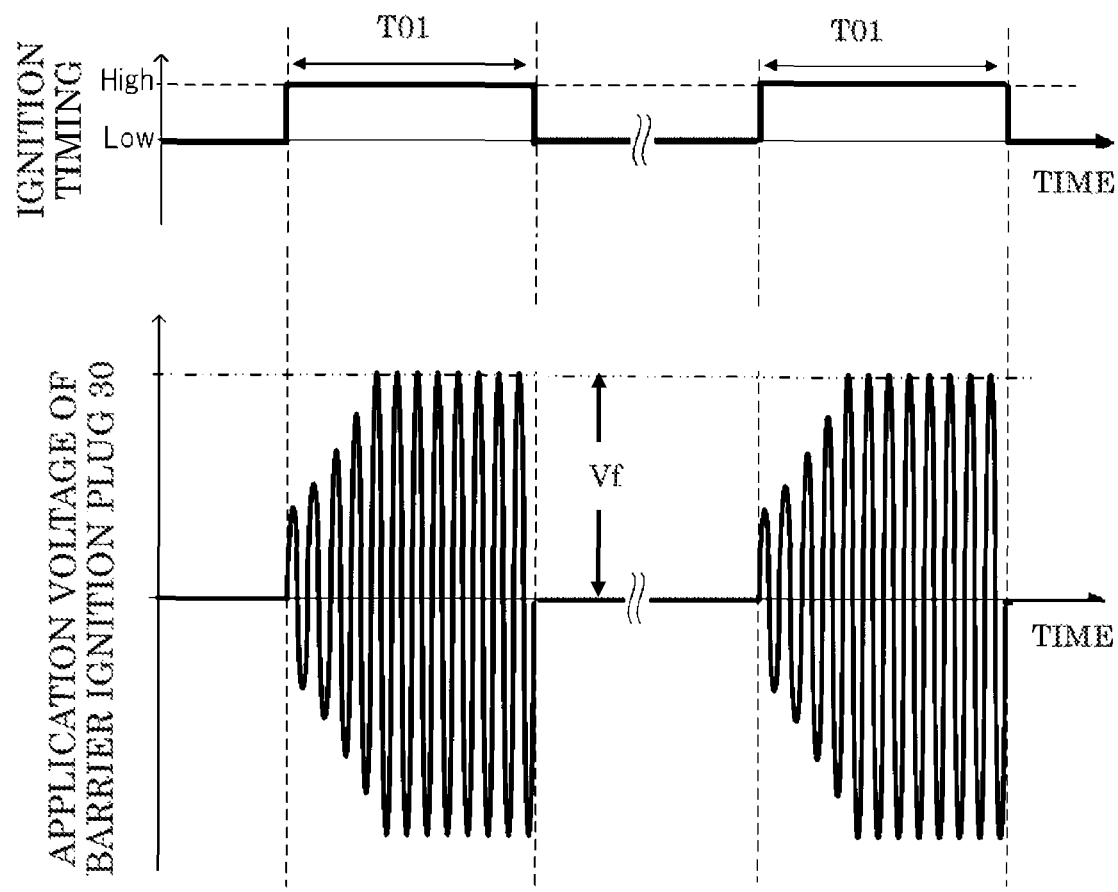
FIG. 7 is a timing chart for explaining ignition control according to Embodiment 3.

FIG. 7 is a timing chart for explaining ignition control according to Embodiment 3 of the present application. In FIG. 7, the horizontal axis represents time and the vertical axis represents instructions of ignition timing and the application voltage of the barrier ignition plug 30. The control circuit 11 applies an ignition voltage for igniting the air-fuel mixture inside the combustion chamber to the barrier ignition plug 30 when the ignition timing instructed from the ECU 9 is High (period T01). It is possible to perform control to apply a voltage necessary for ignition ("voltage necessary for ignition" Vf) to the barrier ignition plug 30 in the control circuit 11 without through the ECU 9 for changing the application voltage of the barrier ignition plug 30 at high speed in accordance with variation in operation conditions of the internal-combustion engine. The control circuit 11 transmits signals of discharge detection, the application voltage of the barrier ignition plug 30, the pressure inside the combustion chamber and so on to the ECU 9.

It is necessary to control the application voltage of the barrier ignition plug 30 for controlling the ignition safely while saving energy. The application voltage of the barrier ignition plug 30 is estimated from the resonant circuit current for controlling the application voltage of the barrier ignition plug 30 in the embodiment. As the electrostatic capacitance in the barrier ignition plug 30 changes depending on the existence of discharge, therefore, it is necessary to detect the existence of discharge and to change the output voltage estimated value for performing estimation with high accuracy.

<Discharge Determination>

Figure 8:
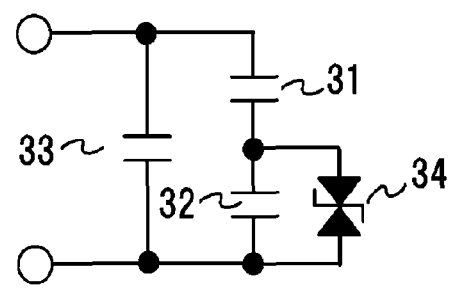
FIG. 8 is a diagram showing an equivalent circuit of a barrier ignition plug in a state of no discharge according to Embodiment 3.

The principle of change in the resonant frequency of the resonant circuit 3 depending on the existence of discharge will be explained. FIG. 8 is a diagram showing an equivalent circuit of the barrier ignition plug in a state of no discharge according to Embodiment 3 of the present application. The circuit is shown by an electrostatic capacitance 31 by a dielectric of the barrier ignition plug 30, an electrostatic capacitance 32 of a gas in a discharge gap, a parasitic capacitance 33 of the barrier ignition plug 30 and a bidirectional Zener diode 34. The bidirectional Zener diode 34 is a circuit simulating the existence of discharge in the discharge gap of the barrier ignition plug 30, which is electrically conducted when the application voltage exceeds positive and negative breakdown voltages corresponding to discharge start voltages.

Figure 9:
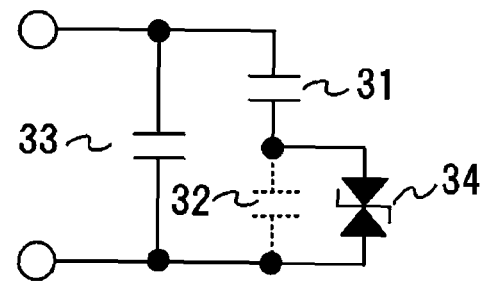
FIG. 9 is a diagram showing an equivalent circuit of the barrier ignition plug in a state of discharge according to Embodiment 3.

FIG. 9 is a diagram showing an equivalent circuit of the barrier ignition plug in a discharging state according to Embodiment 3 of the present application. A difference from FIG. 8 is that the electrostatic capacitance 32 of the gas in the discharge gap connected in parallel with the bidirectional Zener diode 34 can be ignored (shown by dotted lines in the drawing) as the discharge is started and the bidirectional Zener diode 34 is electrically conducted, and a parallel circuit of the electrostatic capacitance 31 by the dielectric of the barrier ignition plug 30 and the parasitic capacitance 33 of the barrier ignition plug 30 is formed. When a combined electrostatic capacitance of the equivalent circuit with no discharge is C1 and a combined electrostatic capacitance of the equivalent circuit with discharge is C2, the combined electrostatic capacitance of the equivalent circuit changes depending on the existence of discharge, and the combined electrostatic capacitance C2 of the equivalent circuit with discharge is higher than the combined electrostatic capacitance C1 of the equivalent circuit with no discharge.

The resonant frequency of the resonant circuit 3 changes by the change in the combined electrostatic capacitance of the barrier ignition plug 30 depending on the existence of discharge. The resonant frequency fr of the resonant circuit 3 is represented by Formula (14) when the inductance such as the leakage inductance of the resonant coil 2 and the transformer 4 is L and a combined electrostatic capacitance of the barrier ignition plug 30 is C3. According to Formula (14), it is found that the resonant frequency fr is reduced when the discharge is started and the combined electrostatic capacitance C3 of the barrier ignition plug 30 is increased.

[Formula 14]

$$fr = 1/(2\pi \cdot \sqrt{(L \cdot c3)}) \qquad (14)$$

Figure 10:
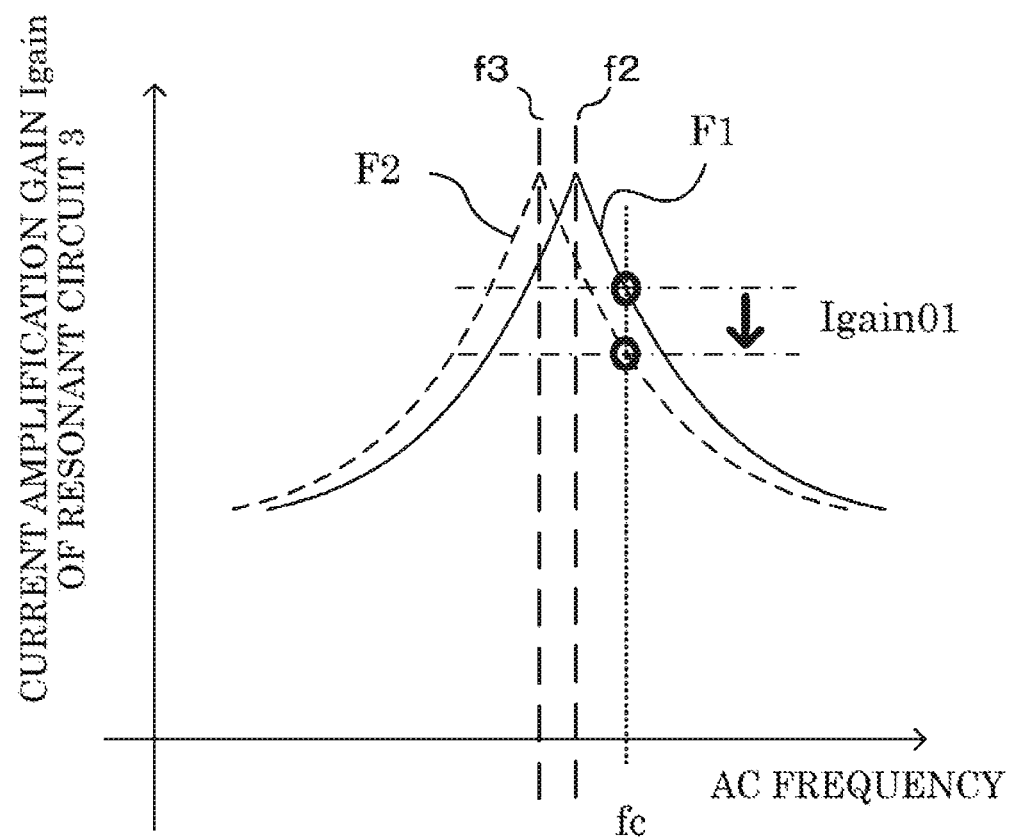
FIG. 10 is a frequency characteristics chart of the resonant circuit according to Embodiment 3.

Next, frequency characteristics of a current amplification gain Igain of the resonant circuit 3 is shown. FIG. 10 is a frequency characteristics chart showing variation of the resonant frequency of the resonant circuit depending on the existence of discharge according to Embodiment 3 of the present application. In FIG. 10, the horizontal axis represents the AC frequency and the vertical axis represents the current amplification gain Igain of the resonant circuit 3, in which a solid line (F1) shows frequency characteristics with no discharge, a dotted line (F2) shows frequency characteristics with discharge. In the resonant frequency, the current amplification gains Igain is the maximum peak value.

A resonant frequency f3 with discharge is lower than a resonant frequency f2 with no discharge. In frequencies equal to or higher than the resonant frequency f2 with no discharge, the current amplification gain Igain is reduced when the discharge is started even in the same frequency, therefore, the resonant circuit current is reduced by a reduction amount (Igain01) of the current amplification gain Igain. On the other hand, the current amplification gain Igain is increased when the discharge is stopped, therefore, the resonant circuit current is increased by an increased amount of the current amplification gain Igain.

In frequencies within a resonant frequency band equal to or lower than the resonant frequency f3 with discharge, the current amplification gain Igain is increased when the discharge is started, therefore, the resonant circuit current is increased by an increased amount of the current amplification gain Igain. On the other hand, the current amplification gain Igain is reduced when the discharge is stopped, therefore, the resonant circuit current is reduced by a reduction amount of the current amplification gain Igain.

Accordingly, it is found that a current difference is generated in the resonant circuit current between starting time of discharge and stopping time of discharge and that the existence of discharge can be determined by using the current difference. Then, the control circuit 11 calculates a current difference Id between a one-cycle previous resonant circuit current and a present-cycle resonant circuit current in the AC cycle based on the resonant circuit current detected by the current detection circuit 14, and determines the existence of discharge of the barrier ignition plug 30 by comparing the current difference Id with a discharge determination threshold that is previously set. Furthermore, the control circuit 11 may determine a discharge start current Ids as an electric current of the resonant circuit 3 in which the discharge of the barrier ignition plug 30 is started based on the resonant circuit current obtained when determining that the discharge of the barrier discharge plug 30 is started.

In the embodiment, the control circuit 11 controls the AC frequency of the inverter 5 to a control frequency fc which is a frequency within the resonant frequency band in which the AC voltage is amplified by resonance of the resonant circuit 3 and set to be equal to or higher than the resonant frequency f2 of the resonant circuit 3 with no discharge. Then, the control circuit 11 determines that the discharge of the barrier ignition plug 30 is started in a case where the current difference Id obtained by subtracting the present-cycle resonant circuit current from the one-cycle previous resonant circuit current is larger than a positive discharge determination threshold IJH set to a positive value, determines that the discharge of the barrier ignition plug 30 is stopped when the current difference Id is smaller than a negative discharge determination threshold IJL set to a negative value, and determines that the discharge state of the barrier ignition plug determined last time is maintained when the current difference Id is between the positive discharge determination threshold IJH and the negative discharge determination threshold IJL.

Figure 11:
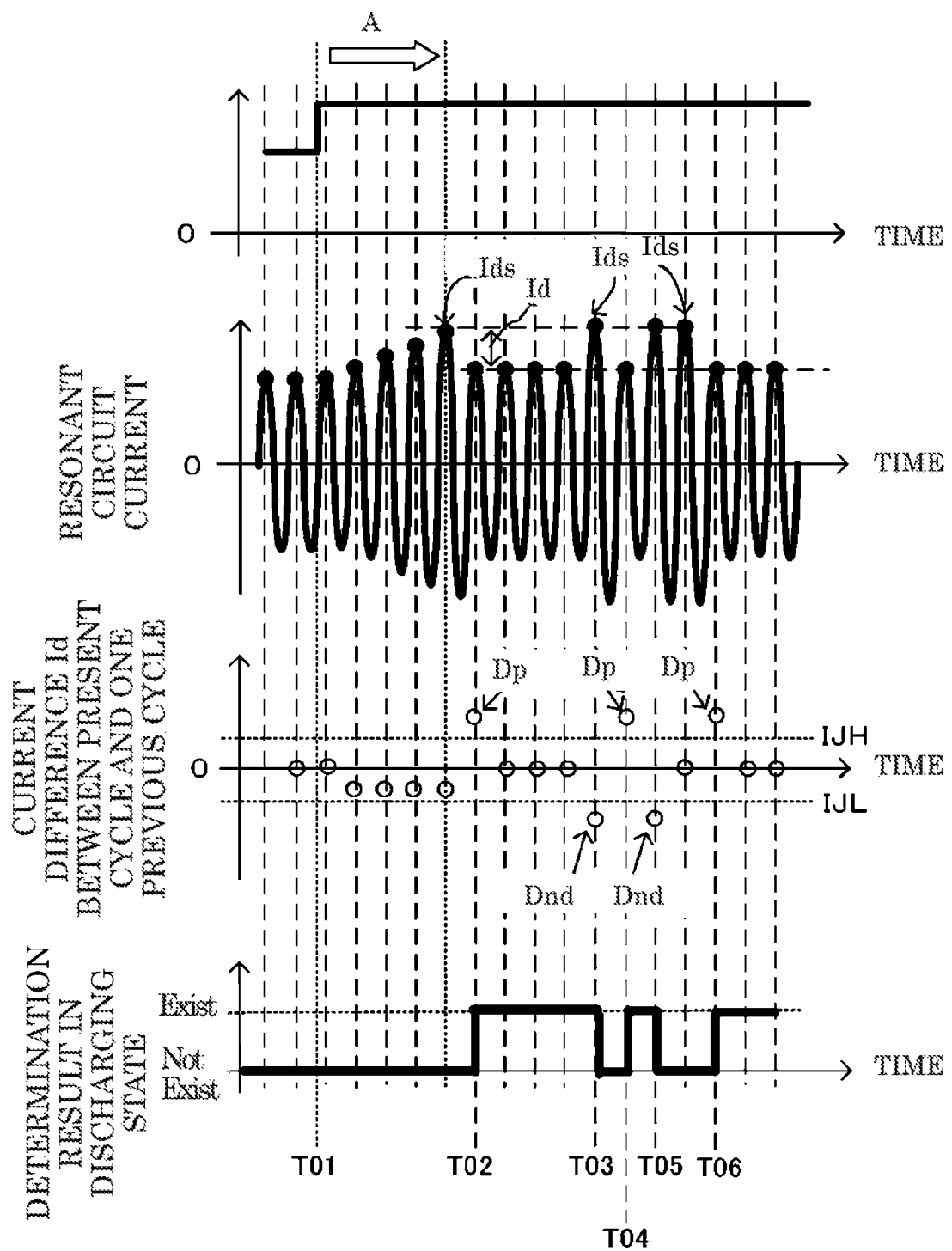
FIG. 11 is a timing chart for determination of discharge according to Embodiment 3.

FIG. 11 shows determination behavior of the existence of discharge and the discharge start voltage. FIG. 11 is a timing chart for explaining the determination of the existence of discharge and the discharge start current Ids according to Embodiment 3 of the present application. The horizontal axis represents time, and the vertical axis represents the output voltage of the DC/DC converter 6, the resonant circuit current, the current difference Id of the resonant circuit current, and determination results of the existence of discharge. After the output voltage of the DC/DC converter 6 is increased at a time T01, the resonant circuit current is increased with a delay due to a time delay caused by the resonant growth as shown by an arrow A. The control circuit 11 detects the maximum peak value of the resonant circuit current.

The discharge is started as the resonant circuit current is increased to the discharge start current Ids, and a present-cycle resonant circuit current is reduced from a one-cycle previous resonant circuit current at a time T02. Accordingly, the current difference Id obtained by subtracting the present-cycle resonant current from the one-cycle previous resonant current is increased. The positive discharge determination threshold IJH is set so as to correspond to the reduction of the current amplification gain Igain due to the start of discharge, and the current difference Id is higher than the positive discharge determination threshold IJH. Therefore, the control circuit 11 determines that the "discharge is started" in the barrier ignition plug 30 at the time T02. Then, the control circuit determines the one-cycle previous resonant circuit current as the discharge start current Ids.

After that, the discharge continues for three AC cycles, therefore, the current difference Id of the resonant circuit current is reduced and is between the positive discharge determination threshold IJH and the negative discharge determination threshold IJL. Accordingly, the control circuit 11 determines that the discharging state continues.

As the discharge is stopped due to effects of an increase of a pressure inside the combustion chamber and the like at a time T03 in the next AC cycle, the resonant circuit current is increased, and the current difference Id is reduced. The negative discharge threshold IJL is set so as to correspond to the increase of the current amplification gain Igain due to the stop of discharge, the current difference Id is lower than the negative discharge determination threshold IJL. Accordingly, the control circuit 11 determines that the discharge of the barrier ignition plug 30 is stopped at the time T03.

As the discharge is started again at a time T04 in the next AC cycle, the resonant circuit current is reduced, and the current difference Id is higher than the positive discharge determination threshold IJH. Therefore, the control circuit 11 determines that the discharge of the barrier ignition plug 30 is started at the time T04. Then, the control circuit 11 determines a one-cycle previous resonant circuit current as the discharge start current Ids.

As the discharge is stopped at a time T05 in the next AC cycle, the resonant circuit current is increased, and the current difference Id is lower than the negative discharge determination threshold IJL. Therefore, the control circuit 11 determines that the discharge of the barrier ignition plug 30 is stopped at the time T05.

As the stop state of the discharge continues in the next AC cycle, the current difference Id of the resonant circuit current is between the positive discharge determination threshold IJH and the negative discharge determination threshold IJL, and the control circuit 11 determines that the state with no discharge continues.

As the discharge is started again at a time T06 in the next AC cycle, the resonant circuit current is reduced, and the current difference Id is higher than the positive discharge determination threshold IJH. Therefore, the control circuit 11 determines that the discharge of the barrier ignition plug 30 is started at the time T06. Then, the control circuit 11 determines a one-cycle previous resonant circuit current as the discharge start current ids. After that, the discharge continues for two AC cycles.

The control circuit 11 may be configured so that the discharge determination thresholds IJI, IJL are changed in accordance with a PD product calculated by multiplication of a pressure P in the combustion chamber and a discharge gap D. For example, the PD product will be large when the pressure P in the combustion chamber is large and the discharge gap D is large. When the PD product is large, the discharge generated in the discharge gap is increased, and the current difference Id of the resonant circuit current is increased, therefore, absolute values of the discharge determination threshold IJH and IJL are set to be large. On the other hand, when the PD product is small, the discharge generated in the discharge gap is reduced, and the voltage difference Id of an application voltage is reduced, therefore, the absolute values of the discharge determination threshold IJH and IJL are set to be small. That is, the control circuit 11 increases the absolute values of the discharge determination threshold IJH and IJL as the PD product is increased.

The control circuit 11 can make probability determination when the PD product is smaller than a preset determination value. Specifically, the control circuit 11 can be configured so as to calculate a probability that the current difference Id is between the positive discharge determination threshold IJH and a positive probability determination threshold set to a positive value smaller than the positive discharge determination threshold IJH or a probability that the current value Id is between the negative discharge determination threshold IJL and a negative probability determination threshold set to a negative value larger than the negative discharge determination threshold IJL and to determine that the discharge of the barrier ignition plug 30 is started when the calculated probability is larger than the preset determination value.

In order to ignite at the barrier ignition plug 30 even when various types of fluctuation factors and variation factors occur, it is necessary to generate the discharge positively. The control circuit 11 may be configured so as to change a command value of the voltage to be applied to the barrier ignition plug 30 to obtain an electric current equal to or higher than the discharge start current Ids based on the determined discharge start current Ids. For example, the control circuit 11 is preferably configured so that the command value of the voltage applied to the barrier ignition plug 30 is changed to a voltage obtained by adding a preset offset voltage a to obtain an electric current equal to or higher than the discharge start current Ids. The offset voltage a is previously set to a voltage value capable of maintaining the discharge.

<Output Voltage Estimation Method by Barrier Ignition Plug 30 (Output Voltage Estimation Method by Using Electrostatic Capacitance C)>

The control circuit 11 estimates the output voltage by using the resonant circuit current I obtained from the current detection circuit 14, the combined electrostatic capacitance C1 of the equivalent circuit with no discharge calculated in advance by the impedance analyzer or the like and the AC frequency fc of the inverter 5 in the case with no discharge according to the discharge detection result. As the voltage is a product of the electric current and the impedance, the output voltage estimated value Vout1 is represented by Formula (15).

[Formula 15]

$$Vout1 \approx I/2\pi \cdot fc \cdot C1) \tag{15}$$

On the other hand, in the case with discharge, the control circuit 11 estimates the output voltage by using the resonant circuit current I obtained from the current detection circuit 14, the combined electrostatic capacitance C2 of the equivalent circuit with discharge in which the electrostatic capacitance is calculated in the discharged state after prior evaluation is performed, and the AC frequency fc of the inverter 5. The voltage is a product of the electric current and the impedance, the output voltage estimated value Vout1 is represented by Formula (16).

[Formula 16]

$$Vout1 \approx I/(2\pi \cdot fc \cdot C2) \tag{16}$$

It is preferable to perform estimation in consideration of an equivalent series resistance R of the barrier ignition plug 30 for further improving estimation accuracy. When an equivalent series resistance with no discharge is R1 and an equivalent series resistance with discharge is R2, the output voltage estimated value Vout1 with no discharge is represented by Formula (17) and the output voltage estimated value Vout1 with discharge is represented by Formula (18).

[Formula 17]

$$Vout1 \approx I \cdot \sqrt{R1^2 + 1/(2\pi \cdot fc \cdot C1)^2} \tag{17}$$

[Formula 18]

$$Vout1 \approx I \cdot \sqrt{R2^2 + 1/(2\pi \cdot fc \cdot C2)^2} \tag{18}$$

It is also preferable to perform estimation in consideration of frequency characteristics C1 (fc), C2 (fc) of the barrier ignition plug 30 with no discharge and with discharge. The output voltage estimated value Vout1 with no discharge is represented by Formula (19) and the output voltage estimated value Vout1 with discharge is represented by Formula (20).

[Formula 19]

$$Vout1 \approx I \cdot \sqrt{R1^2 + 1/(2\pi \cdot fc \cdot C1)(fc))^2} \quad (19)$$

[Formula 20]

$$Vout1 \approx I \cdot \sqrt{R2^2 + I/(2\pi \cdot fc \cdot C2)(fc))^2} \quad (20)$$

<Output Voltage Estimation Method by Barrier Ignition Plug 30 (Output Voltage Estimation Method Using Inductance L of Resonant Coil)>

Figure 12:
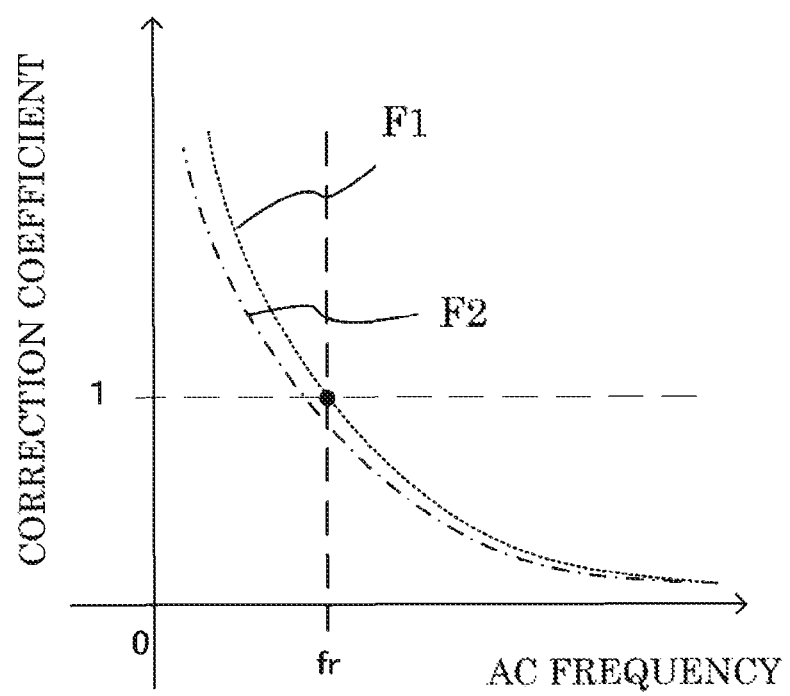
FIG. 12 is a relationship characteristics chart of the correction coefficient according to Embodiment 3.

FIG. 12 is a relationship characteristics chart between the AC frequency of the inverter 5 and the correction coefficient with discharge and with no discharge according to Embodiment 3 of the present application. The chart is a map showing relationship characteristics with discharge and with no discharge in which the horizontal axis represents the AC frequency of the inverter 5 and the vertical axis represents the correction coefficient. A correction coefficient K2 in a case of a curve F1 with discharge is a value obtained by dividing the voltage Vout applied to the Barrier Ignition Plug 30 with no discharge by the voltage VL applied to the resonant coil 2, and a correction coefficient K3 in a case of a curve F2 with no discharge is a value obtained by dividing the voltage Vout applied to the Barrier Ignition Plug 30 with discharge by the voltage VL applied to the resonant coil 2. The above-described map is provided with the voltage VL applied to the resonant coil 2 and the voltage Vout applied to the Barrier Ignition Plug 30 as frequency relationship characteristics in the control circuit by using a voltage probe or the like as prior evaluation.

The output voltage estimated value Vout1 obtained after correction with no discharge by using the above map is represented by Formula (21).

[Formula 21]

$$Vout1 \approx K2 \cdot I \cdot 2\pi \cdot fc \cdot L \quad (21)$$

The output voltage estimated value Vout1 obtained after correction with discharge by using the above map is represented by Formula (22).

[Formula 22]

$$Vout1 \approx K3 \cdot I \cdot 2\pi \cdot fc \cdot L \quad (22)$$

The estimation may be performed in consideration of the equivalent series resistance R of the resonant coil 2 for further improving the estimation accuracy. When the equivalent series resistance with no discharge is R1 and the equivalent series resistance with discharge is R2, the output voltage estimated value Vout1 with no discharge is represented by Formula (23) and the output voltage estimated value Vout1 with discharge is represented by Formula (24).

[Formula 23]

$$Vout1 \approx I \cdot \sqrt{R1^2 + (K2 \cdot 2\pi \cdot fc \cdot L)^2} \quad (23)$$

[Formula 24]

$$Vout1 \approx I \cdot \sqrt{R2^2 + (K3 \cdot 2\pi \cdot fc \cdot L)^2} \quad (24)$$

Furthermore, estimation may be performed in consideration of frequency characteristics L (fc) of the resonant coil 2. The output voltage estimated value Vout1 with no discharge is represented by Formula (25) and the output voltage estimated value Vout1 with discharge is represented by Formula (26).

[Formula 25]

$$Vout1 \approx I \cdot \sqrt{R1^2 + (K2 \cdot 2\pi \cdot fc \cdot L(fc))^2} \quad (25)$$

[Formula 26]

$$Vout1 \approx I \cdot \sqrt{R2^2 + (K3 \cdot 2\pi \cdot fc \cdot L(fc))^2} \quad (26)$$

As described above, the existence of discharge is determined by the resonant circuit current I, and the output voltage estimated value Vout1 is switched based on detection of discharge, thereby realizing estimation with high accuracy. As the switching timing, switching may be performed in a next control cycle of the cycle in which the discharge is detected or may be performed after control cycles of plural times.

An example of switching the output voltage estimated value Vout1 according to the existence of discharge will be explained with reference to FIG. 13. To switching the formula means to change an electrostatic capacitance value or a resistance value and a correction coefficient value in the formula.

Figure 13:
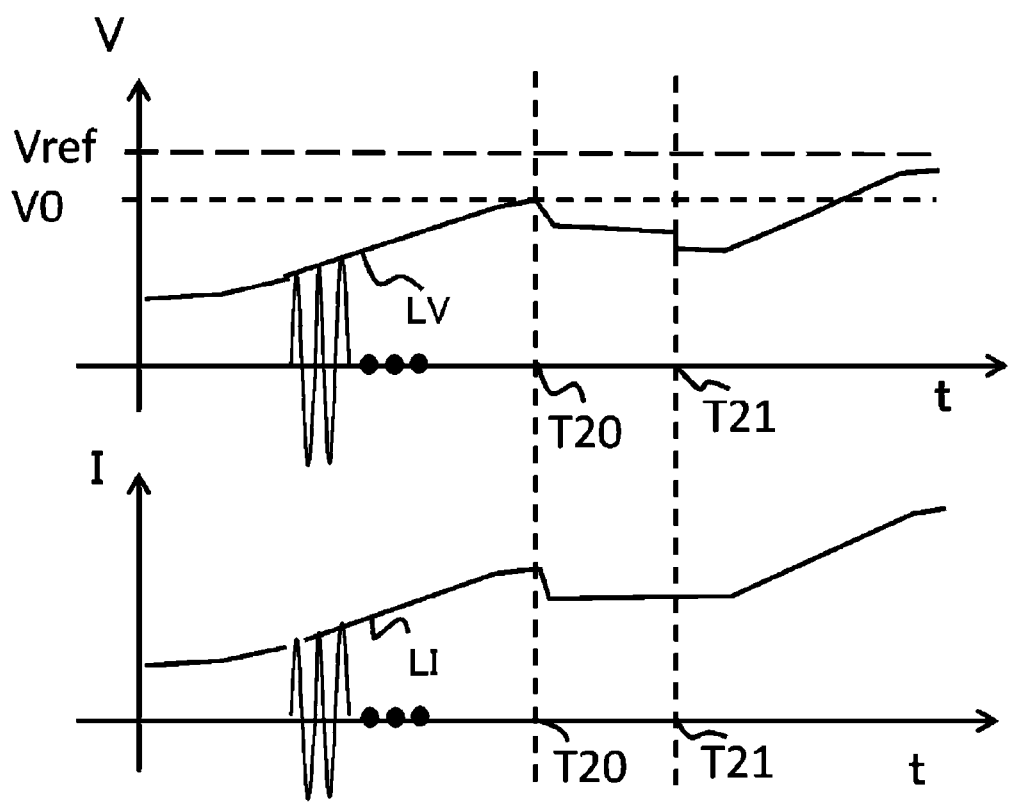
FIG. 13 is a diagram showing switching an output voltage estimated value after detection of discharge according to Embodiment 3.

In FIG. 13, the horizontal axis represents time "t", the vertical axis in an upper chart of FIG. 13 represents the voltage V, the vertical axis in a lower chart represents the current I, "LV" in the drawing denotes an envelope curve of the output voltage estimated value Vout1, and "LI" denotes an envelope curve of the resonant circuit current I. In a waveform in which the output voltage estimated value Vout1 is approximated to the output voltage command value Vref, the envelope curve LV indicates that the discharge is started after a time T20 and indicates that the formula for calculating the output voltage estimated value Vout1 is changed at a time T21. Here, the output voltage command value Vref is set to a value equal to or higher than a discharge start voltage V0. Note that envelope curves of a negative voltage and a negative current are not shown here.

In FIG. 13, when the output voltage estimated value Vout1 is calculated by using Formula (15) before the discharge, the formula is switched to Formula (16) after the discharge as an example. Referring to FIG. 13, the resonant frequency is reduced due to the discharge after the discharge is started at the time T20, therefore, the resonant circuit current I is reduced and the output voltage estimated value Vout1 calculated by Formula (15) is also reduced accordingly. However, the calculated output voltage estimated value Vout1 is not calculated in consideration of increase in the electrostatic capacitance due to the discharge, therefore, the output voltage estimated value Vout1 calculated by Formula (15) will be a large value as compared with an actual output voltage (actual value). Accordingly, the formula for calculating the output voltage estimated value Vout1 is switched to Formula (16), and a value of the electrostatic capacitance is changed from C1 to C2 to thereby obtain an estimated value with consideration of the discharge. As a result, the output voltage estimated value Vout1 close to the actual output voltage (actual value) can be obtained. As the switching timing, the discharge is detected, and the formula for calculating the output voltage estimated value Vout1 is switched in a next control cycle of the cycle in which the discharge is detected or in control cycles of plural times based on the discharge detection result.

Similarly, when the output voltage estimated value Vout1 is calculated by using Formula (21) before the discharge, the value of the correction coefficient used for calculation is switched from K2 to K3 by switching the formula from Formula (21) to Formula (22) after the detection of the discharge. Furthermore, concerning the formula with consideration of the equivalent series resistance, switching may be performed after the detection of discharge. Concerning the formula with consideration of the frequency characteristics L (fc) of the resonant coil 2, switching may be performed.

Embodiment 3 shows the barrier-discharge type ignition system in which the existence of discharge is determined by the resonant circuit current I and the switching of the output voltage estimated value is performed based on the detection of discharge as the method of estimating the output voltage with high accuracy in the case where the load is the barrier ignition plug 30 and the electrostatic capacitance changes according to the existence of discharge. That is, the embodiment shows that the electrostatic capacitance of the barrier ignition plug is changed according to the existence of discharge. When the output voltage can be estimated with high accuracy based on the detection of discharge, adequate control accuracy can be realized at the time of controlling the voltage to a target load voltage (constant output voltage control).

Embodiment 4

In Embodiment 4, the output voltage control for operating the barrier discharge-type ignition system 200 more safely by using the voltage estimation method with high accuracy explained in Embodiment 3 will be explained. When the control is realized, the barrier discharge-type ignition system 200 can be configured safely in a small size. Explanation of the same parts as the above Embodiments 1, 2 and 3 is omitted. Although only the voltage Vout applied to the barrier ignition plug 30 is estimated in Embodiment 3, the present embodiment differs from Embodiment 3 in a point that the voltage VL applied to the resonant coil 2 and the voltage Vout applied to the barrier ignition plug 30 are estimated at the same time to operate the barrier-discharge type ignition system 200.

The output voltage control of the barrier-discharge type ignition system 200 is performed by using the AC frequency of the inverter 5 and the output DC voltage of the DC/DC converter 6.

In a case where the barrier-discharge type ignition system 200 is operated at the AC frequency fc of the inverter 5 higher than the resonant frequency fr of the resonant circuit 3, the voltage VL applied to the resonant coil 2 is higher than the voltage applied to the barrier ignition plug 30 as shown in FIG. 4C. As the AC frequency fc of the inverter 5 is operated so as to be farther from the resonant frequency fr, a balance between the voltage VL applied to the resonant coil 2 and the voltage Vout applied to the barrier ignition plug 30 is collapsed more largely and the voltage difference is further increased.

Here, when the barrier-discharge type ignition system 200 is controlled so that the output DC voltage of the DC/DC converter 6 is boosted in the condition that the AC frequency fc of the inverter 5 is far from the resonant frequency fr of the resonant circuit 3, the voltage Vout applied to the barrier ignition plug 30 may exceed a withstand voltage of the resonant coil 2 before the voltage Vout is controlled to an arbitrary voltage. The withstand voltage of the resonant coil 2 is designed with a margin, however, the resonant coil 2 may be increased in size when the resonant coil 2 is excessively designed, therefore, control is performed so as to realize the safe and small-sized resonant coil 2 without being excessively designed.

The controller 13 of the barrier-discharge type ignition system 200 according to the embodiment estimates the voltage VL applied to the resonant coil 2 and the voltage Vout applied to the barrier ignition plug 30 at the same time, performing control so that a differential voltage is equal to or lower than a threshold voltage when the differential voltage exceeds a positive threshold voltage VJH and a negative threshold voltage VJL based on a differential voltage Vd. When the voltage applied to the resonant coil 2 to be estimated is VL1, and the voltage applied to the barrier ignition plug 30 to be estimated is Vout1, the differential voltage Vd is represented by Formula (27)

[Formula 27]

$$VL1 - Vout1 = Vd \quad (27)$$

The positive threshold voltage VJH and the negative threshold voltage VJL do not exceed the withstand voltage of the resonant coil, which are threshold voltages in which the system is operated safely. The voltage estimated value Vout1 applied to the barrier ignition plug 30 is estimated by using the estimation method explained in Embodiments 1 to 3. On the other hand, the voltage estimated value VL1 applied to the resonant coil 2 is estimated by using an estimation method based on the resonant circuit current I obtained from the current detection circuit 14, the inductance L of the resonant coil 2 calculated in advance and the AC frequency of the inverter 5. It is also preferable to perform estimation in consideration of the equivalent series resistance or frequency characteristics of the inductance L for improving the accuracy, though the formula is not shown.

Concerning the method of performing control so as to reduce the differential voltage Vd, an example of control of the AC frequency of the inverter 5 and the output DC voltage of the DC/DC converter 6 will be explained with reference to FIG. 14.

Figure 14:
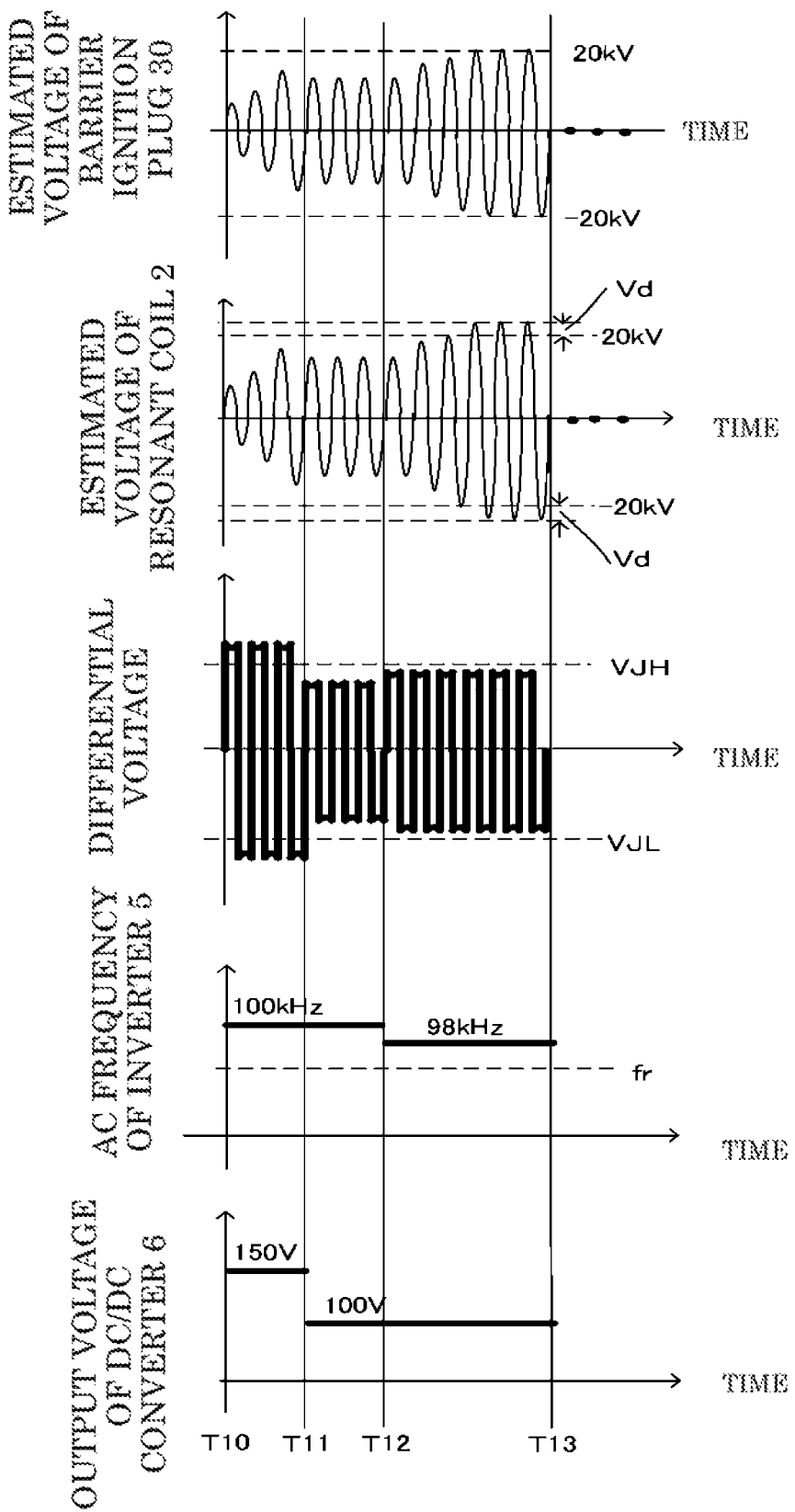
FIG. 14 is a timing chart for explaining a control method according to Embodiment 4.

FIG. 14 shows a timing chart for explaining the method of performing control so as to reduce the differential voltage according to Embodiment 4 of the present application. The horizontal axis of FIG. 14 represents time. Then, vertical axes represent the estimated voltage of the barrier ignition plug 30, the estimated voltage of the resonant coil 2, the differential voltage, the AC frequency of the inverter 5 and the output voltage of the DC/DC converter 6. The control is performed so that the estimated voltage of the barrier ignition plug 30 becomes ±20 kV of a target voltage from a time T10 until reaching a time T13. Phases of the estimated voltage of the barrier ignition plug 30 and the estimated voltage of the resonant coil 2 seem to correspond to each other as they are derived from estimation formulas based on the electric current, however, actual phases are different by 180 degrees.

In a period between the time T10 to a time T11 when the AC frequency of the inverter 5 is 100 kHz and the output voltage of the DC/DC converter is 150V, the differential voltage exceeds the positive threshold voltage VJH and the negative threshold voltage VJL. Accordingly, the controller 13 performs control so as to reduce the differential voltage by changing the output voltage of the DC/DC converter from 150V to 100V at the time T11. The controller 13 controls the AC frequency fc of the inverter 5 to 98 kHz at a time T12, thereby approximating the frequency to the resonant frequency fr of the resonant circuit 3. As a result, the output voltages can be controlled within ±20 kV as a target while the differential voltage Vd is between the positive threshold voltage VJH and the negative threshold voltage VJL. In the explanation, the control of the DC/DC converter 6 and the inverter 5 is completed by control of one time, however, the DC/DC converter 6 and the inverter 5 can be controlled repeatedly.

Although the control is continued in the explanation of the embodiment, it is possible to perform control so as to stop the barrier-discharge type ignition system 200 when the differential voltage Vd exceeds the positive threshold voltage VJH and the negative threshold voltage VJL as a protection function.

Embodiment 4 shows the barrier-discharge type ignition system 200 in which the output voltage of the barrier ignition plug 30 is estimated as well as the voltage of the resonant coil 2 is estimated, and the inverter 5 and the DC/DC converter 6 are controlled so that the differential voltage is between the positive threshold voltage VJH and the negative threshold voltage VJL to thereby obtain the safe and small-sized barrier-discharge type ignition system 200.

Other Embodiments

Other embodiments which can be executed by being combined with the embodiments of the present application will be explained. Configurations of respective embodiments explained below are not limited to ones independently applied but may be applied by being combined with a configuration of another embodiment unless contradiction occurs.

In the above respective embodiments, the control circuit 11 may be configured to increase/reduce the output AC voltage of the inverter 5 by increasing/reducing an on-period (on-duty ratio) of the switching device of the inverter 5.

In the above respective embodiments, when the inverter is configured by the full-bridge inverter and has a first arm and a second arm, the control circuit 11 may be configured to increase/reduce the output AC voltage of the inverter 5 by performing control to fix the AC frequency of the inverter and to change time between the timing when a switching device of a first arm circuit is turned on and the timing when a switching device of a second arm circuit is turned on.

In the above respective embodiments, the example in which the control circuit 11 determines the existence of discharge based on the resonant circuit current detected by the current detection circuit 14 and determines the discharge start current Ids has been explained. However, the embodiments of the present application are not limited to this. That is, the ECU 9 may be configured to determine the existence of discharge based on the resonant circuit current detected by the current detection circuit 14 and to transmit a determination result of the discharge start current Ids to the control circuit 11. Sharing of processing functions between the control circuit 11 and the ECU 9 may be arbitrarily determined.

In the above respective embodiments, the example in which the controller 13 is configured by the control circuit 11' and the ECU 9 has been explained. However, the control circuit 11 may be incorporated in the ECU 9, and the control circuit 11 and the ECU 9 may be integrally formed. It may be understood that the controller 13 is configured by the control circuit 11 that directly controls the DC/DC converter 6 and the inverter 5, and that the ECU 9 is not included in the controller 13.

In Embodiments 1 to 3, explanation has been made that the control circuit 11 (or the controller 13) estimates the output voltage of the load and controls the voltage to a target load voltage based on the estimated load voltage, however, it is not always necessary to calculate the load voltage in the control circuit 11 for controlling the load voltage. For example, when the relationship between the resonant circuit current and the load voltage is measured in advance and stored in the control circuit 11 as relationship characteristics, the magnitude of the resonant circuit current with respect to the magnitude of the load voltage can be found, therefore, only the magnitude of the resonant circuit current is preferably controlled to arbitrary current. As a result, it is possible to perform control to obtain an arbitrary load voltage in accordance with relationship characteristics.

Furthermore, explanation has been made that the technique can be applied to the barrier ignition plug as an implementation of the load in the above embodiments, and the technique can be also applied to a power conversion device having a resonant circuit such as an ozonizer as part of the load.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added or eliminated. At least one of the constituent components mentioned in at least one of the preferred embodiments may be selected and combined with the constituent components mentioned in another preferred embodiment.

REFERENCE SIGNS LIST

1 capacitor, 2 resonant coil, 3 resonant circuit, 4 transformer, 5 inverter, 6 DC/DC converter, 7 battery, 9 ECU (engine control unit), 10 power supply circuit, 11 control circuit, 13 controller, 14 current detection circuit, 20, 23 arithmetic processing device, 21, 24 storage device, 22, 25 input/output circuit, 30 barrier ignition plug, 100 power conversion device, 200 barrier-discharge type ignition system, Vout application voltage, VL application voltage of resonant coil, Vout1 estimated value of application voltage, VL1 estimated value of application voltage of resonant coil, fr resonant frequency of resonant circuit, f1, fc AC frequency of inverter, IJH positive discharge determination threshold, IJL negative discharge determination threshold, a offset voltage, f2 resonant frequency of resonant circuit with no discharge, f3 resonant frequency of resonant circuit with discharge, VJH positive threshold voltage, VJL negative threshold voltage

The invention claimed is:

1. A power conversion device comprising:
an inverter supplying an AC voltage;
a resonant circuit including a resonant coil and a load, amplifying the AC voltage by resonance;
a current detection circuit detecting a resonant circuit current flowing in the resonant circuit; and
a control circuit having an estimator for a load voltage based on the resonant circuit current, an AC frequency of the inverter and an electrostatic capacitance of the load, the electrostatic capacitance having been calculated in advance, or an estimator for the load voltage based on the resonant circuit current, the AC frequency of the inverter, an inductance of the resonant coil and a correction coefficient previously set from a relationship between a voltage of the resonant coil and the load voltage such that the load voltage is represented by multiplying the voltage of the resonant coil by the correction coefficient.

2. The power conversion device according to claim 1, wherein the control circuit controls an output to a target load voltage based on the estimated load voltage.

3. The power conversion device according to claim 2, wherein the inverter includes a DC/DC converter supplying a DC voltage to the inverter, and
the control circuit controls the load voltage by controlling at least one of an output voltage of the DC/DC converter and the AC frequency of the inverter.

4. The power conversion device according to claim 1, further comprising:
a transformer supplying the AC voltage supplied from the inverter to the resonant circuit, the AC voltage having a magnitude determined in accordance with a turn ratio.

5. The power conversion device according to claim 4, wherein the current detection circuit detecting an electric current flowing on a primary side of the transformer is provided, and
the resonant circuit current flowing in the resonant circuit is calculated by the control circuit based on the electric current flowing on the primary side of the transformer and the turn ratio of the transformer.

6. The power conversion device according to claim 1, wherein the current detection circuit is provided in the resonant circuit, and
the resonant circuit current flowing in the resonant circuit is directly detected.

7. The power conversion device according to claim 1, wherein the resonant circuit current flowing in the resonant circuit is detected on a low side.

8. The power conversion device according to claim 1, wherein the control circuit is configured to estimate the load voltage by adding information of an equivalent series resistance or frequency characteristics of the resonant coil or the load to the estimator for the load voltage.

9. The power conversion device according to claim 1, wherein the load is a capacitor.

10. The power conversion device according to claim 1, wherein the load is a barrier ignition plug.

11. The power conversion device according to claim 1, wherein the control circuit estimates the load voltage of the load as well as estimates a voltage applied to the resonant coil, performing control so that an estimated differential voltage becomes smaller than a threshold voltage that is previously set.

12. The power conversion device according to claim 1, wherein the control circuit estimates the load voltage of the load as well as estimates a voltage applied to the resonant coil, stopping when an estimated differential voltage exceeds a threshold voltage that is previously set.

13. The power conversion device according to claim 1, wherein the control circuit has the estimator for the load voltage based on the resonant circuit current, the AC frequency of the inverter and the electrostatic capacitance of the load.

14. The power conversion device according to claim 1, wherein the control circuit has the estimator for the load voltage based on the resonant circuit current, the AC frequency of the inverter, the inductance of the resonant coil and the correction coefficient previously set from the relationship between the voltage of the resonant coil and the load voltage.

15. A power conversion device comprising:
an inverter supplying an AC voltage;
a resonant circuit including a resonant coil and a load, amplifying the AC voltage by resonance;
a current detection circuit detecting a resonant circuit current flowing in the resonant circuit; and
a control circuit having an estimator for a load voltage based on the resonant circuit current, an AC frequency of the inverter and an electrostatic capacitance of the load or an estimator for the load voltage based on the resonant circuit current, the AC frequency of the inverter, an inductance of the resonant coil and a correction coefficient previously set from a relationship between a voltage of the resonant coil and the load voltage, wherein
the load is a barrier ignition plug, and
the control circuit calculates a current difference between a one-cycle previous resonant circuit current and a present-cycle resonant circuit current in an AC cycle based on the resonant circuit current detected by the current detection circuit, and determines the existence of discharge in the barrier ignition plug by comparing the current difference with a discharge determination threshold that is previously set.

16. The power conversion device according to claim 15, wherein the control circuit determines a discharge start current in which the discharge of the barrier ignition plug is started based on the resonant circuit current at the time of determining that the discharge of the barrier ignition plug is started.

17. The power conversion device according to claim 1, wherein the control circuit changes the discharge determination threshold in accordance with a PD product calculated by multiplication of a pressure in a combustion chamber and a discharge gap.

18. The power conversion device according to claim 15, wherein an electrostatic capacitance of the barrier ignition plug is changed in accordance with the existence of discharge based on determination of the existence of discharge.

19. The power conversion device according to claim 15, wherein the correction coefficient is changed in accordance with the existence of discharge based on determination of the existence of discharge.

* * * * *